Jan. 15, 1929.　　　　　　　　　　　　　　　1,698,989
L. S. CHADWICK ET AL
AUTOMATIC CONTROL MECHANISM FOR DAMPERS AND THE LIKE
Filed May 18, 1925　　　11 Sheets-Sheet 1
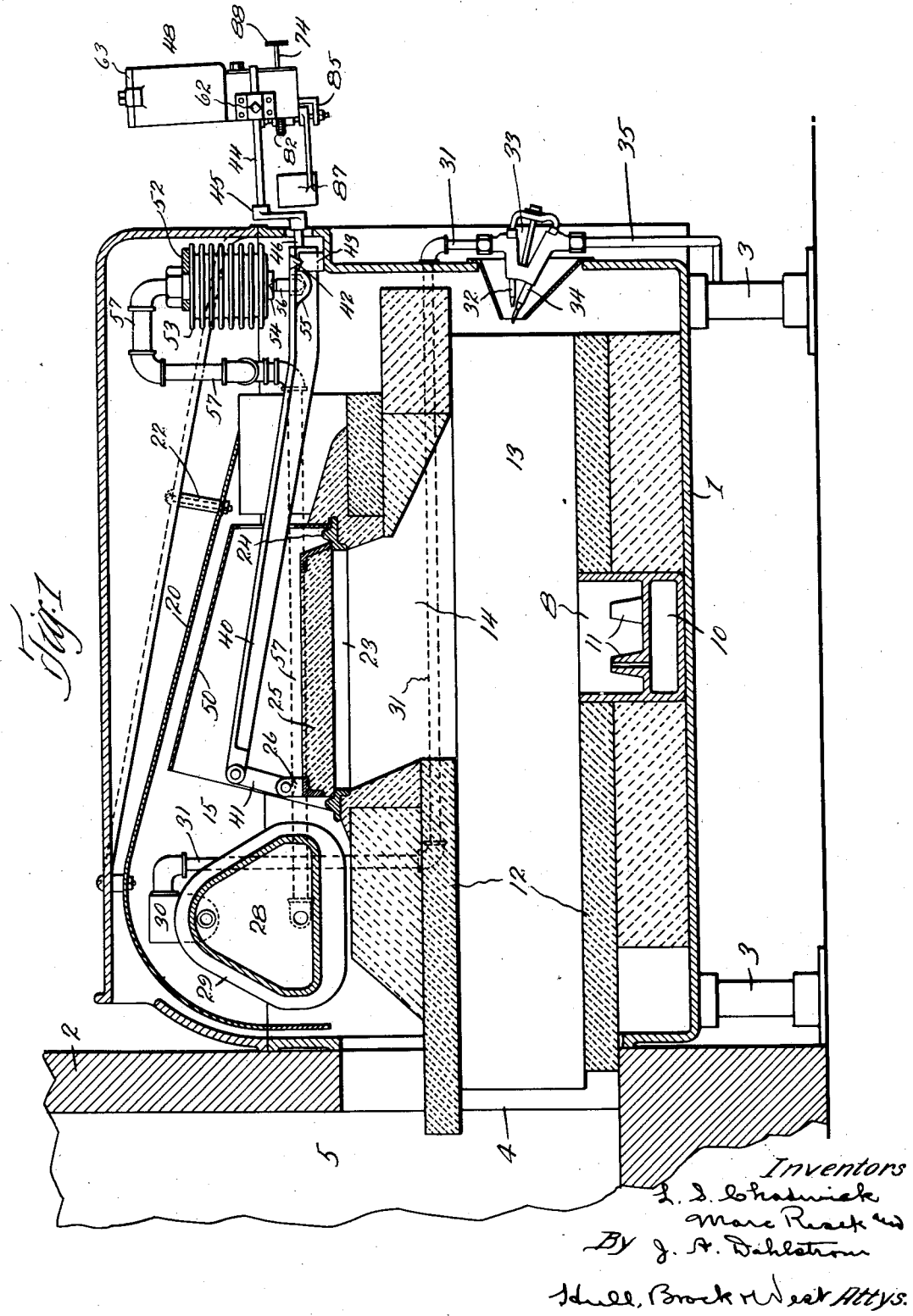

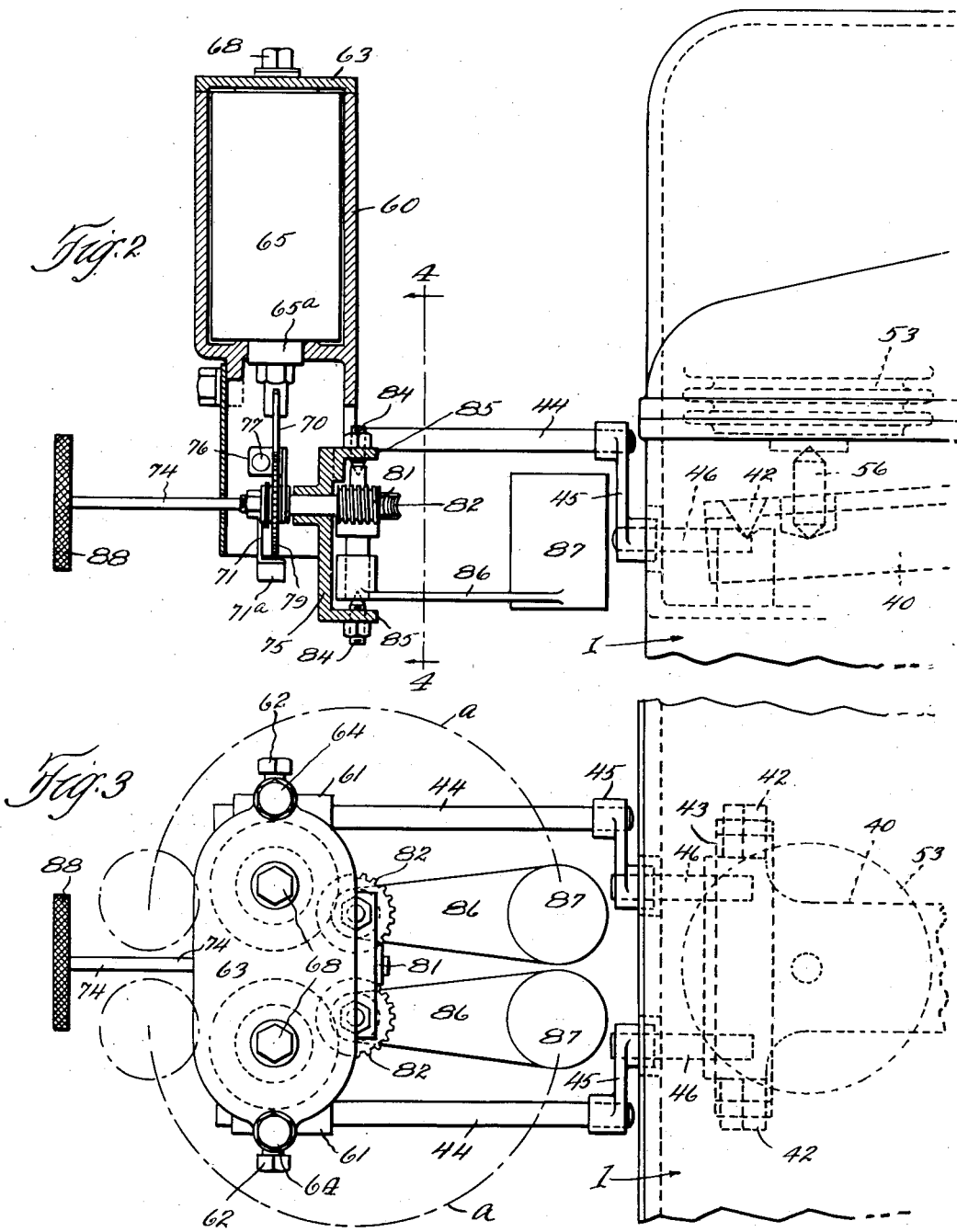

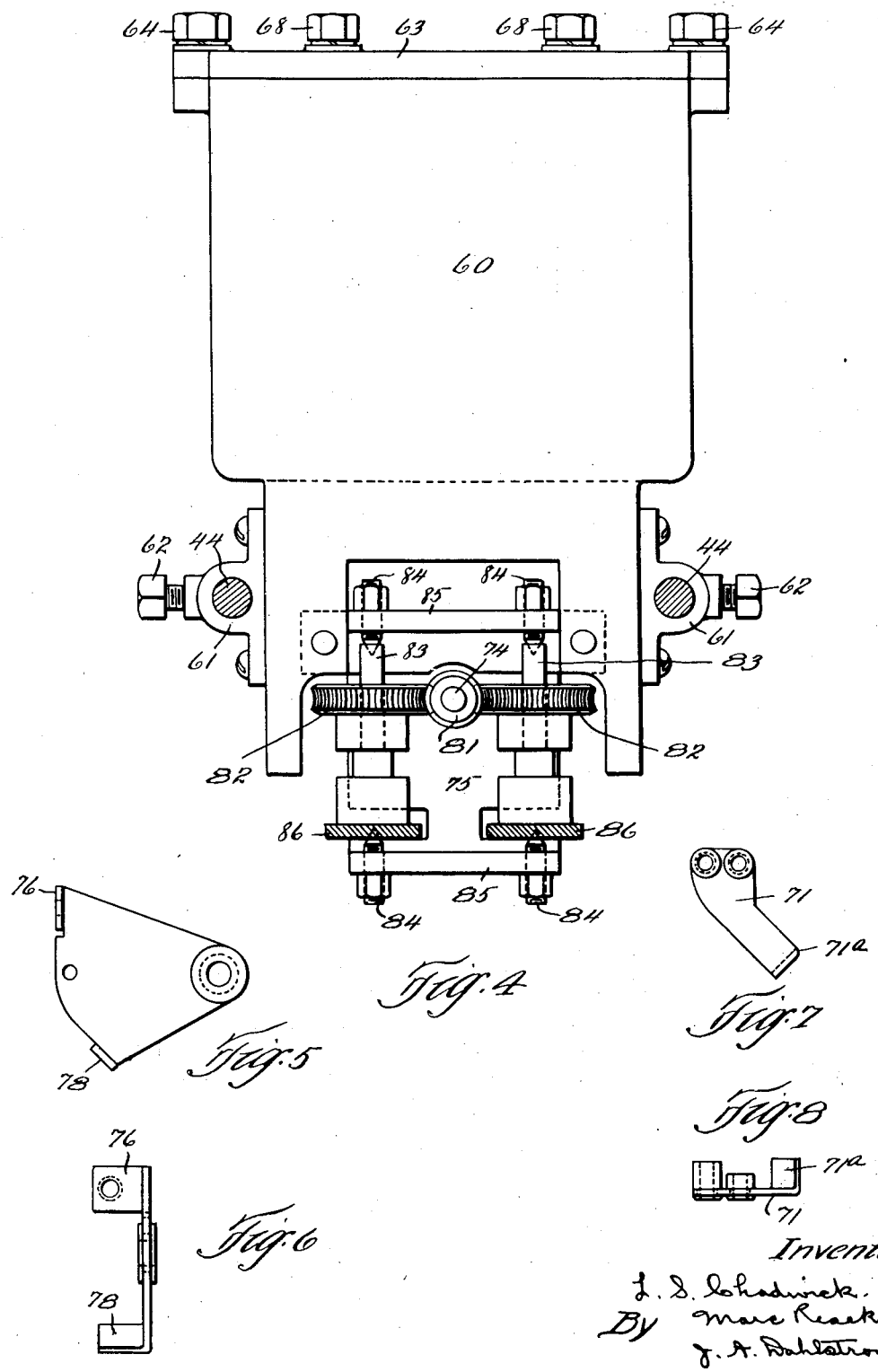

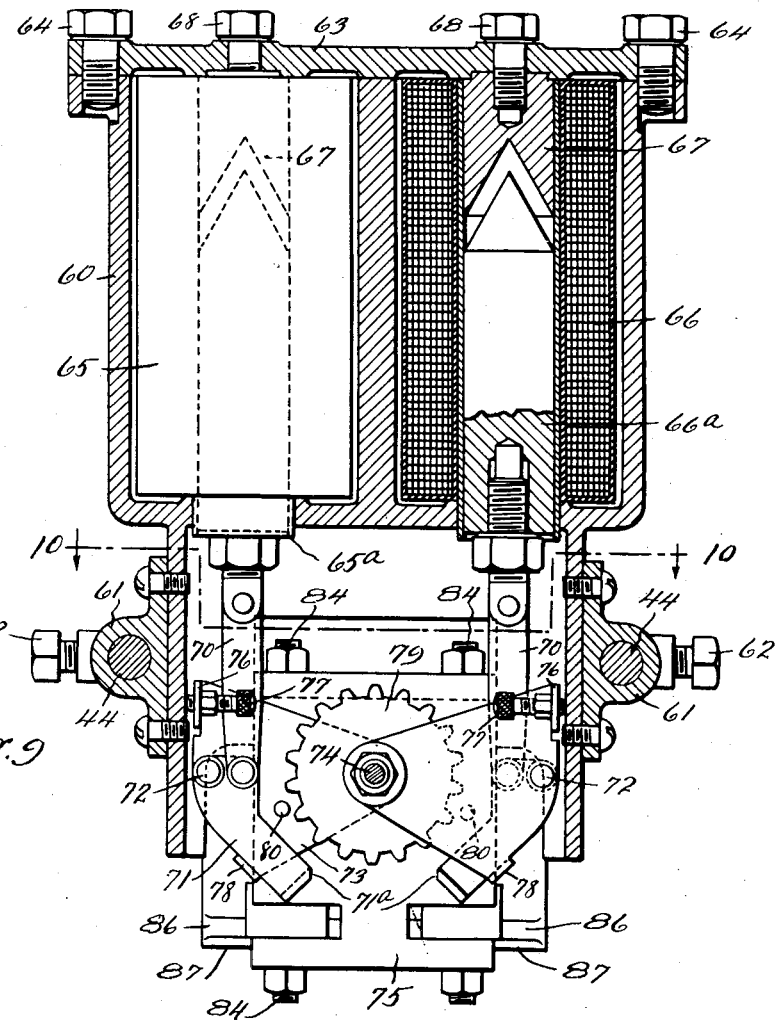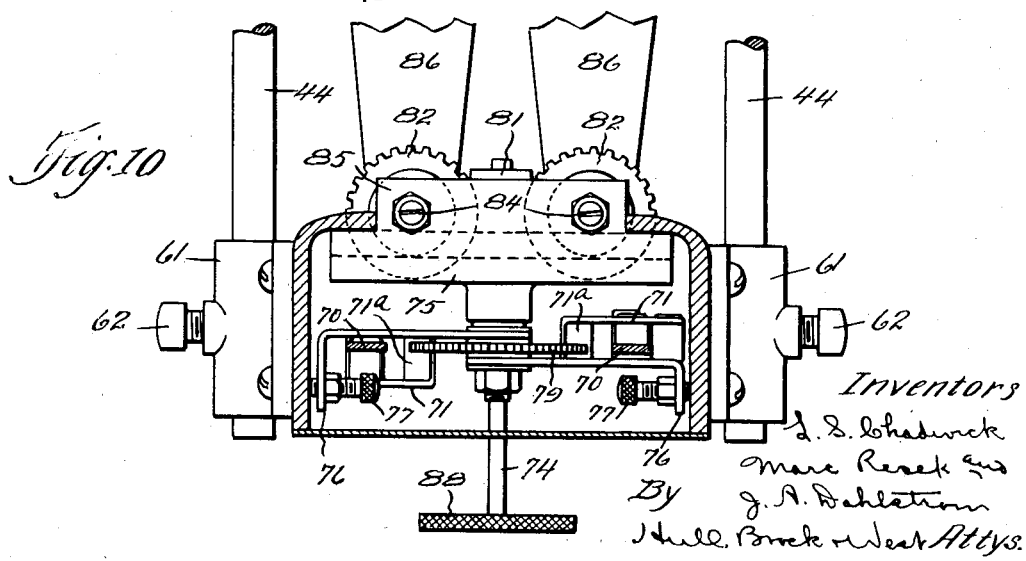

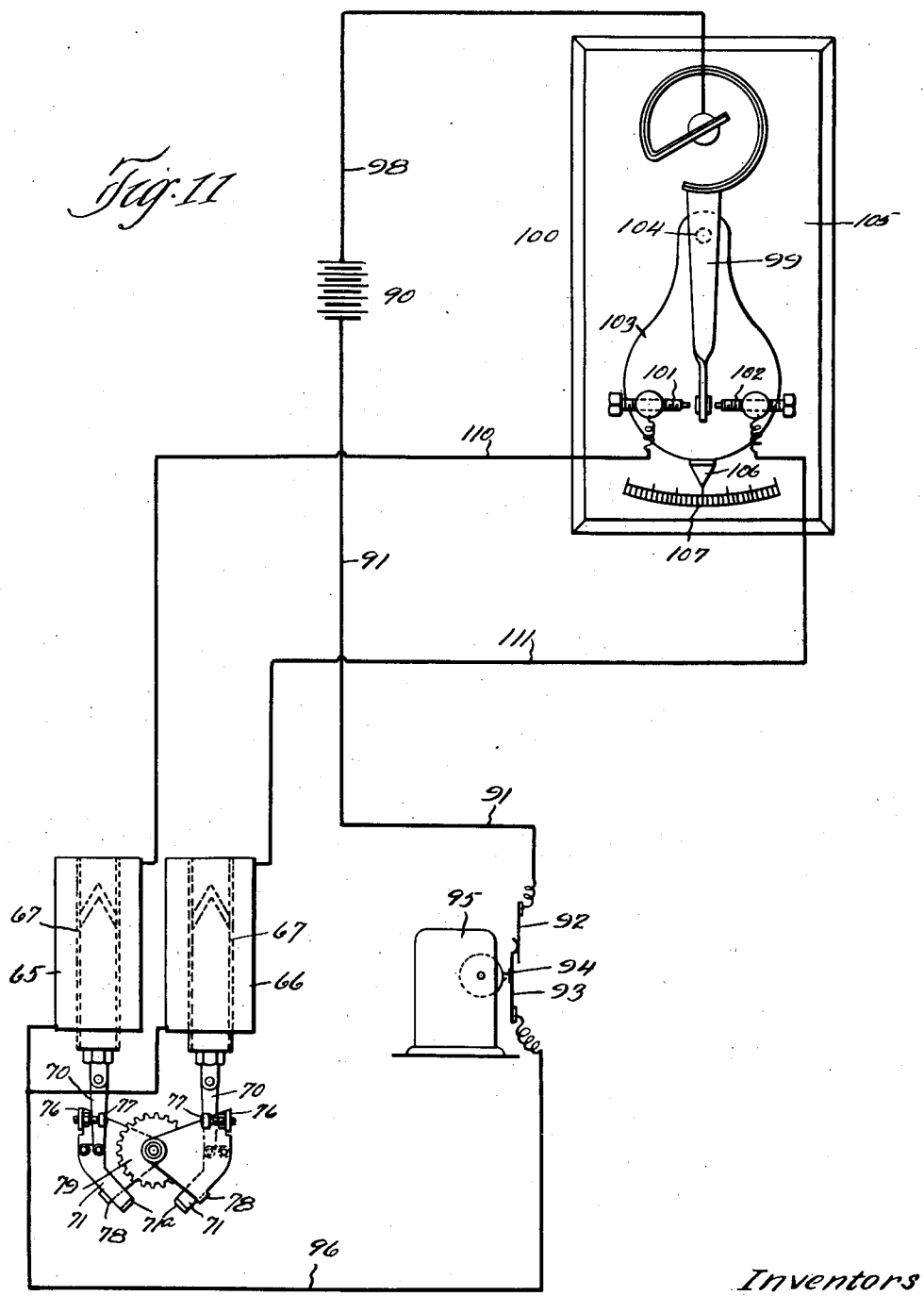

Jan. 15, 1929.    L. S. CHADWICK ET AL    1,698,989
AUTOMATIC CONTROL MECHANISM FOR DAMPERS AND THE LIKE
Filed May 18, 1925    11 Sheets-Sheet 6
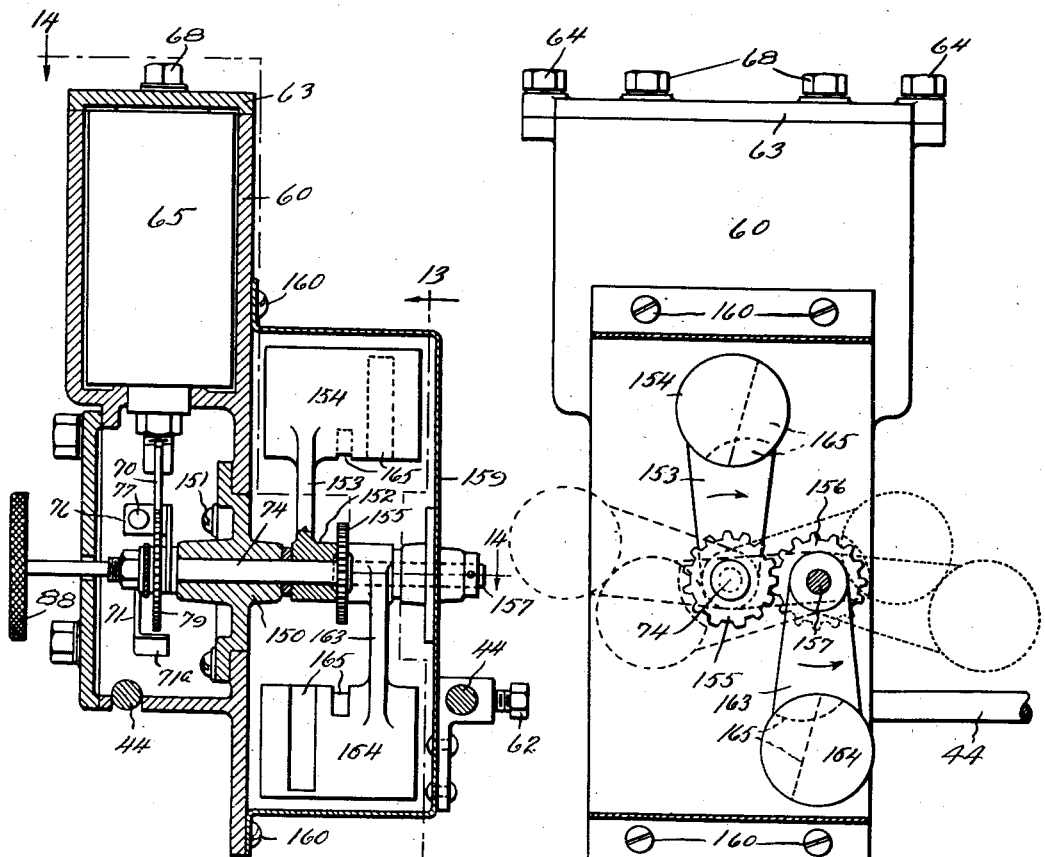
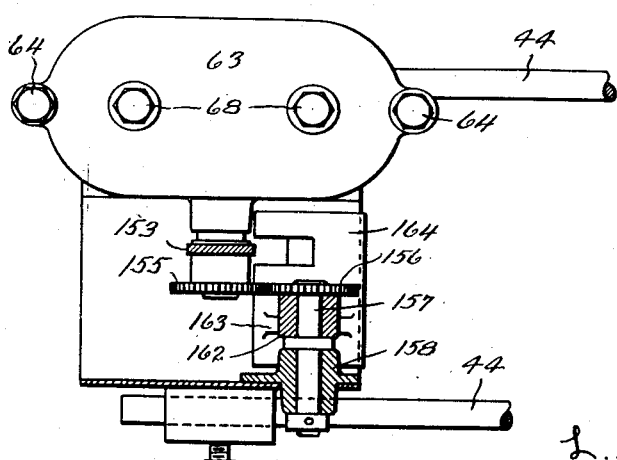

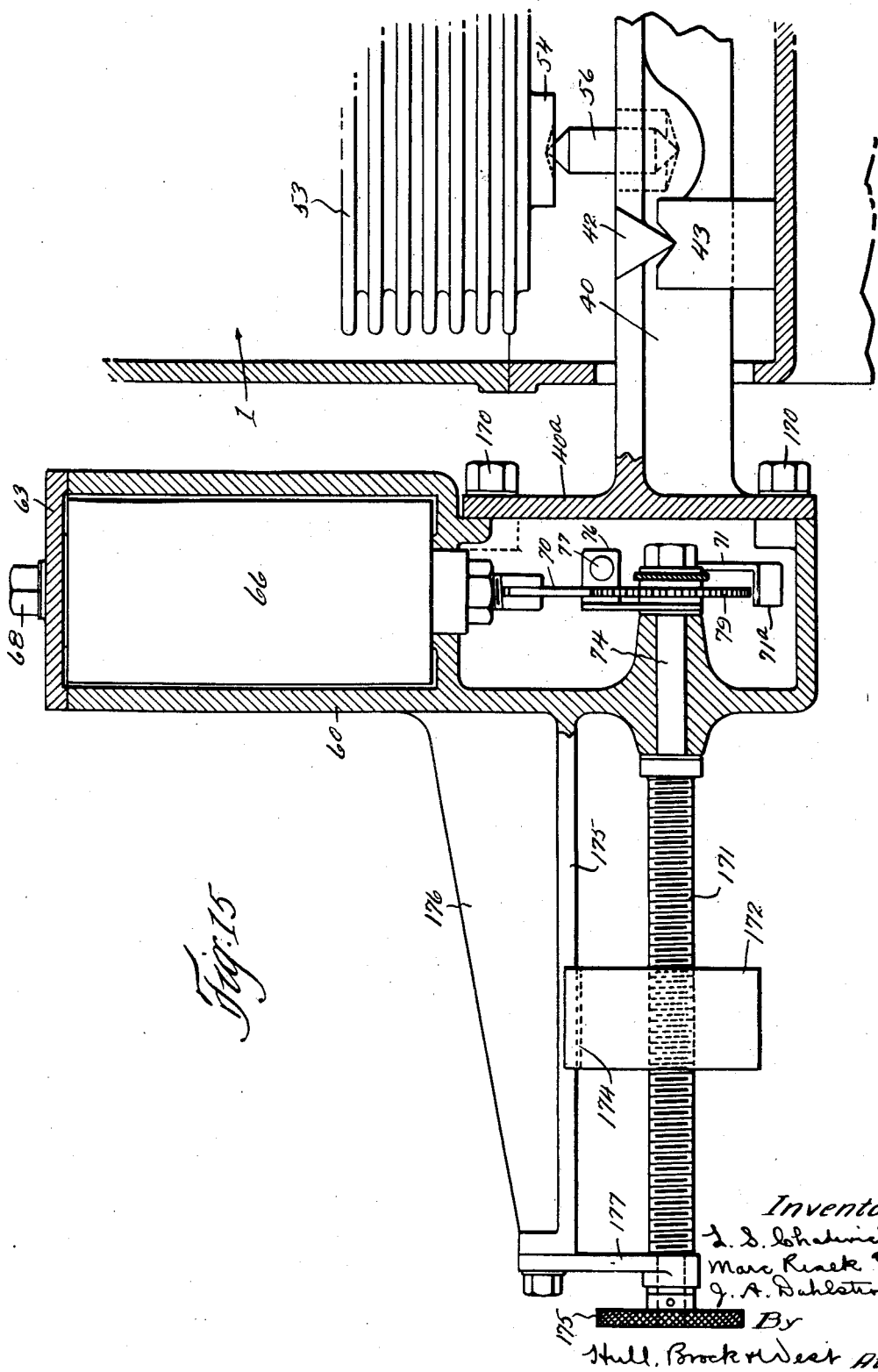

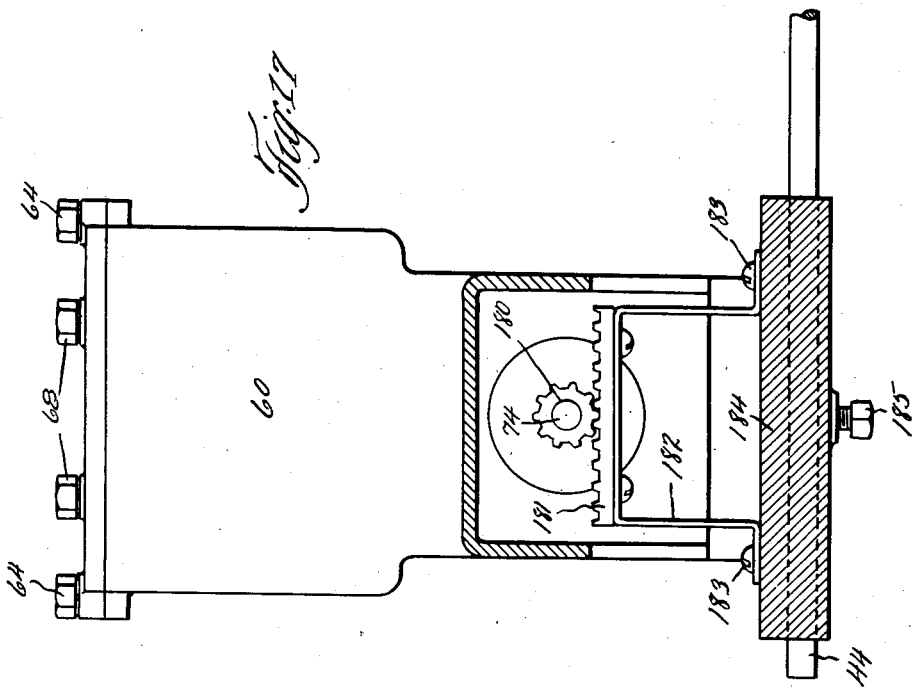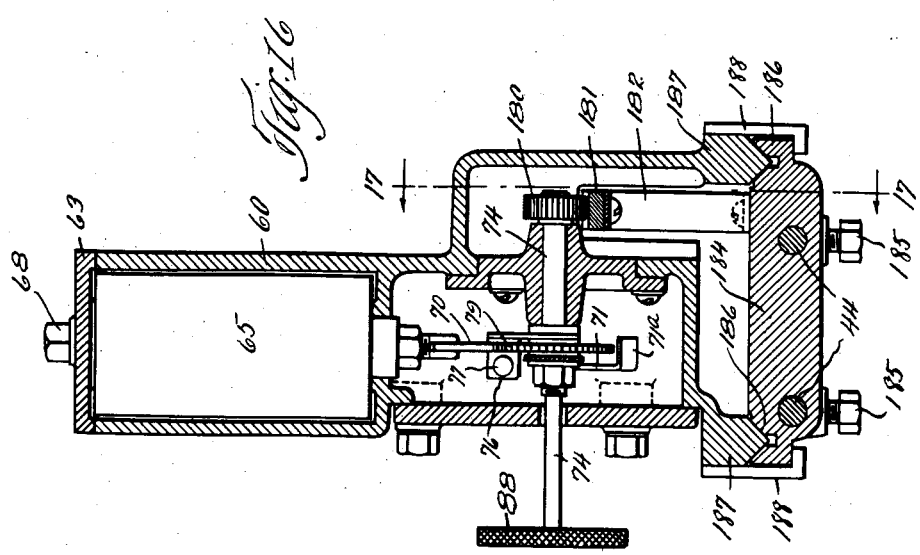

Jan. 15, 1929.
L. S. CHADWICK ET AL
1,698,989
AUTOMATIC CONTROL MECHANISM FOR DAMPERS AND THE LIKE
Filed May 18, 1925    11 Sheets-Sheet 9
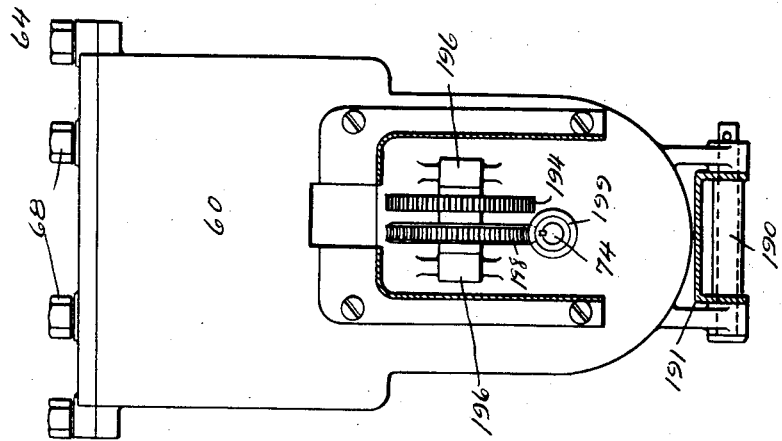
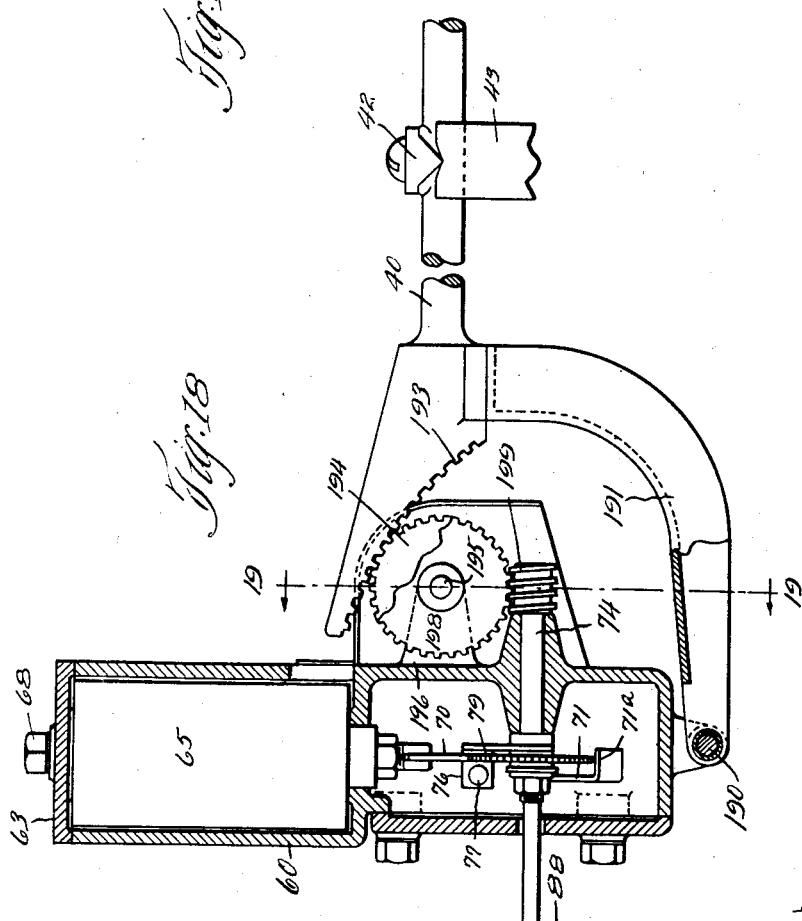
Inventors
L. S. Chadwick,
Marc Reack and
J. A. Dahlstrom
By Hull, Brock and West Attys.

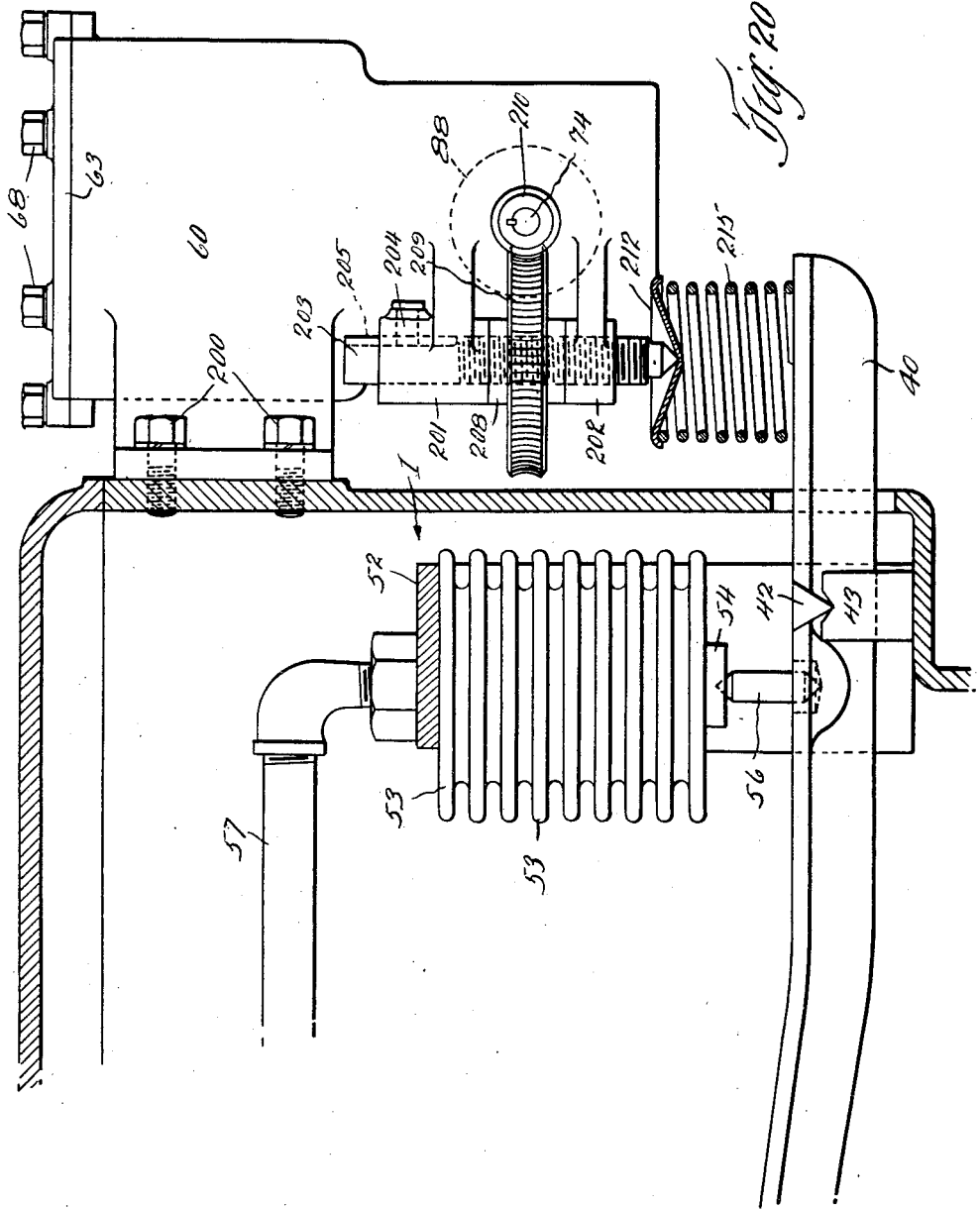

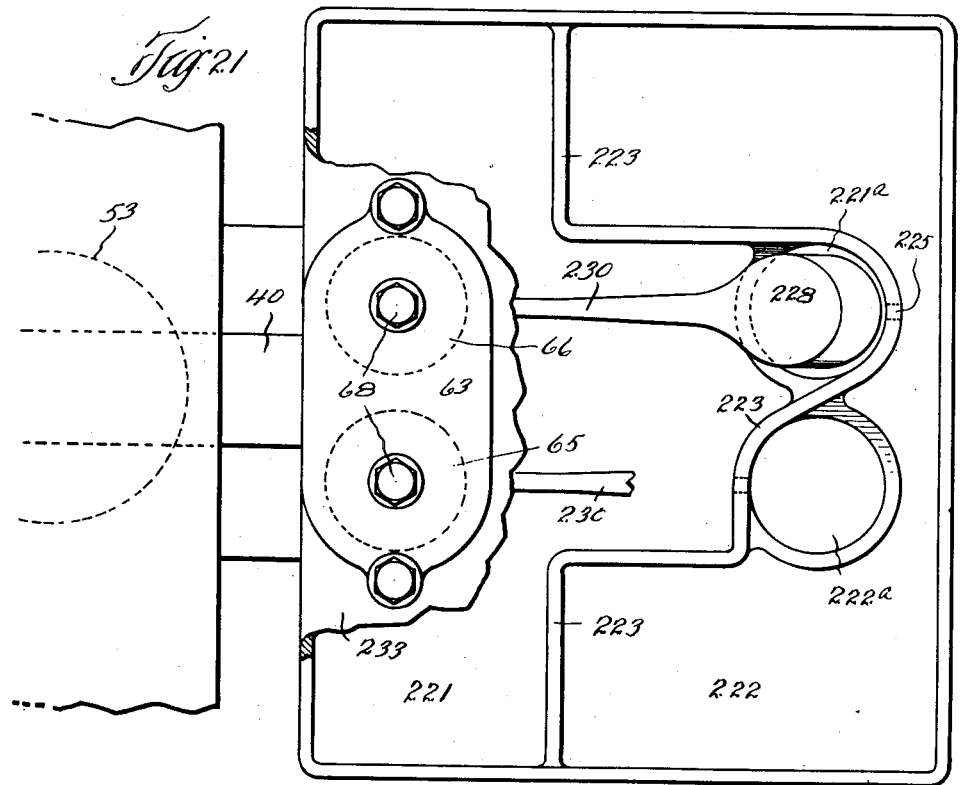
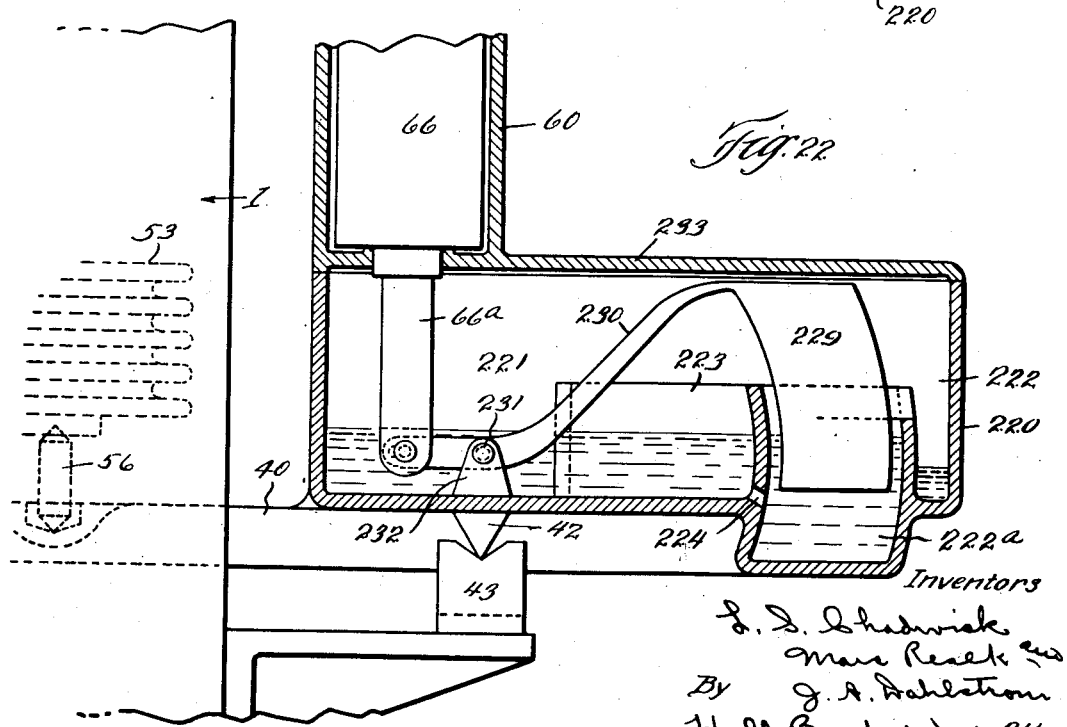

Patented Jan. 15, 1929.

1,699,989

UNITED STATES PATENT OFFICE.

LEE S. CHADWICK, OF SHAKER HEIGHTS VILLAGE, MARC RESEK, OF CLEVELAND HEIGHTS, AND JOHN ALGER DAHLSTROM, OF EAST CLEVELAND, OHIO, ASSIGNORS TO PERFECTION STOVE COMPANY, OF CLEVELAND, OHIO, A CORPORATION OF OHIO.

AUTOMATIC-CONTROL MECHANISM FOR DAMPERS AND THE LIKE.

Application filed May 18, 1925. Serial No. 30,999.

The invention relates to automatic variable power control mechanism for dampers, valves and the like, an adaptation of the same being found in the fuel oil burning apparatus shown in an application bearing Serial No. 24,052, and entitled "Heating systems" filed by Marc Resek, one of the present applicants, on the 18th day of April, 1925.

It is the purpose of our invention to provide mechanism of the above character that is reliable; that is gradual yet positive of operation; that operates in reverse directions accordingly and as frequently as the circumstances affecting its operation change to make such reversal expedient; that is substantial and very durable, and that is practically immune from disorder.

Several embodiments of the invention are illustrated in the accompanying drawings, and in those views wherein we have shown the mechanism associated with the part to be controlled, we have selected for such part the damper of the fuel oil burning apparatus disclosed in the above mentioned application because the mechanism is peculiarly suited to that purpose.

In the drawings, Fig. 1 is a sectional side elevation of fuel oil burning apparatus equipped with our automatic control mechanism for governing the action of the damper; Fig. 2 is a central vertical section through the control mechanism and includes a part of the fuel oil burning apparatus in elevation; Fig. 3 is a plan view of what is shown in Fig. 2; Fig. 4 is a sectional rear elevation of the control mechanism on a scale considerably enlarged over that of Figs. 2 and 3, the plane of section being indicated by the line 4—4 of Fig. 2; Figs. 5 and 6 are views at right angles to each other of one of the pawl carrying plates of the mechanism; Figs. 7 and 8 are, respectively, views similar to Figs. 5 and 6 of one of the pawls involved in the mechanism; Fig. 9 is a sectional front elevation of the mechanism; Fig. 10 is a horizontal section through the mechanism substantially on the line 10—10 of Fig. 9; Fig. 11 is a wiring diagram of the thermostatically controlled electric circuit which governs the operation of the mechanism; Figs. 12 and 13 are sectional elevations at right angles to each other, and Fig. 14 is a sectional plan view, of a modification of the control mechanism, the plane of section of Fig. 14 being indicated by the correspondingly numbered line of Fig. 12; Fig. 15 is a sectional side elevation of another form of the invention, the view including a part of the fuel oil burning apparatus; Figs. 16 and 17 are sectional elevations at right angles to each other of another modification, the plane of section of Fig. 17 being indicated by the line 17—17 of Fig. 16; Figs. 18 and 19 are, respectively, a sectional side elevation and a sectional rear elevation of another form of the invention, the plane of section of Fig. 19 being designated by the line 19—19 of Fig. 18; Fig. 20 shows a part of the fuel oil burning apparatus in section with another form of our automatic control mechanism associated therewith; and Figs. 21 and 22 are, respectively, a plan view, and a sectional side elevation, of a modification of the invention wherein liquid is used as the shiftable weight, parts being broken away in Fig. 21 to reveal certain structural features.

The fuel oil burning apparatus comprises a metallic box-like casing 1 that is supported a suitable distance above the floor and in operative relation to a furnace 2 by legs 3, the furnace having an opening 4 through which the products of combustion pass from the apparatus to the fire box 5.

Disposed transversely of the bottom portion of the casing 1 is a preheating burner 8, the same being shown as in the nature of a basin into which a quantity of liquid fuel may be introduced, air to support combustion being admitted through a passageway 10 and a series of tubular bosses 11 which project above the surface of the oil. Obviously any appropriate form of preheating burner may be substituted for that just described as, for example, a gas burner where a supply of gas is available. The lower portion of the casing 1 is provided with a lining 12 of suitable refractory material which encloses a combustion chamber 13 that communicates at its rear end with the fire box 5 through the aforesaid opening 4.

A passageway 14 opens through the roof of the combustion chamber into a compartment 15, the top of which is formed by a shell 20 that is shown as spaced from and secured to the top of the casing 1, as by bolts 22. If desired, the space between the shell and top may be filled with suitable heat insulating material. At its rear end the compartment 15 communicates with the fire box of the furnace through the top portion of the opening 4.

The upper end of the passageway 14 is surrounded by a metal frame 23. A bead 24 extends about the upper side of this frame and is spaced a suitable distance from the inner edge thereof; and adapted to rest upon the frame, inwardly of the bead 24, is a damper 25. This damper is made up of a metal frame 26 that carries a body of refractory material.

Situated within the rear end of the compartment 15, where it may be exposed to the products of combustion escaping through the passageway 14 from the combustion chamber when the damper 25 is open, is a steam generator 28, shown as provided with heat abstracting fins 29. The generator is kept supplied with water to a substantially constant level by means of suitable mechanism not shown, but which may be the same as that disclosed in the hereinbefore mentioned application. This feature constitutes no part of our present invention and accordingly illustration is deemed unnecessary. The steam generator 28 is provided with a steam dome 30 from which a pipe 31 leads to the steam nozzle 32 of an injector burner 33. The oil nozzle of the burner is designated 34 and it is supplied with fuel oil through a pipe 35 from a suitable source (not shown).

A lever 40 has its inner end loosely connected, through a link 41, to the corresponding end of the damper 25. The lever is provided with opposed knife edge bearings 42 (Figs. 1 and 3) which are engaged in V-notches of a support 43. The end of the lever opposite the one connected to the damper is constructed of a pair of rods 44 which are united, through members 45, with rods 46 that have their inner ends embedded in the casting which constitutes the major portion of the lever. Mounted upon the rods 44 so that it may be set at various positions therealong is the automatic control mechanism of our invention, designated generally by the numeral 48, and which we shall presently describe in detail. This mechanism is so positioned upon the lever that it will overbalance the damper 25 under normal conditions, the inner end of the damper under such conditions being lifted so as to establish communication between the combustion chamber 13 and the compartment 15 and deflect the products toward the generator 28.

A hood 50 extends over the damper and the adjacent end of the lever 40 to protect the shell 20 from the intense heat of the flame.

Supported, as by a member 52, above the fulcrum of the lever with its axis slightly to the rear thereof is a metallic bellows 53. Confined between the opposed depressed bearings 54 and 55 that are carried, respectively, by the bellows and the lever 40 is a thrust pin 56. Communication between the water compartment of the steam generator 28 and the bellows 53 is established through a pipe 57.

Returning now to the automatic control mechanism 48, illustrated in detail in Figs. 2 to 10, inclusive, the same is composed of a housing 60 to the opposite sides of the lower portion of which are secured bearings 61 that are slidably engaged on the rods 44. The control mechanism may be adjusted along the rods to the required position wherein it may be held against accidental displacement by a set screw 62 that is threaded through one of the bearings 61. Contained within the upper portion of the housing 60, and covered by a lid 63 that is held in place by screws 64, are solenoids 65 and 66. The fixed portions 67 of the cores of the solenoids are secured to the cover 63 by screws 68. The movable cores of the respective solenoids 65 and 66 are designated 65$^a$ and 66$^a$. The lower ends of these movable cores are equipped with studs to which are pivotally connected links 70. These links are similarly connected at their lower ends to offset portions of pawls 71 that are fulcrumed on pins 72 carried by what we shall term pawl-carrying plates 73. These plates are journaled upon a shaft 74 that has bearing in a cross frame 75 sustained by and between the opposed walls of the lower portion of the housing 60. The pawl carrying plates 73 may swing about the axis of the shaft 74 and they are provided with lugs 76 through which adjusting screws 77 are threaded to abut against adjacent walls of said lower portion of the housing 60. Stops 78 on the pawl carrying plates 73 limit the drop of the pawls and consequently the descent of the movable cores 65$^a$ and 66$^a$ of the solenoids. When either of the solenoids is energized, the initial movement of its core will swing the corresponding pawl 71 on its pivot to engage its nose 71$^a$ with one of the teeth of a gear 79 that is fixed to the shaft 74; and continued upward movement of the solenoid core will, through the intervention of the pawl, swing the corresponding pawl carrying plate 73 upon the shaft 74 and, through the pawl 71, turn the gear and the shaft in a direction depending upon which one of the solenoids is acting. To prevent the pawls from jamming with the gear teeth, stops 80 are carried by the pawl carrying plates to limit the upward pivotal movement of the pawls.

Beyond the side of the frame 75 opposite that on which the above described mechanism is located, the shaft 74 is equipped with a worm 81 that meshes with worm wheels 82 that are fastened to vertical shafts 83. These shafts are countersunk at their ends and bear upon pointed studs 84 that are threaded through top and bottom rails 85 of the frame 75, this manner of supporting the shafts insuring freedom of rotation. Fixed to the lower end of each shaft is an arm 86 which carries at its outer end a weight 87. As the shaft 74 is rotated in the manner above described it will, through worm 81, worm wheels 82 and shafts 83, swing the weights 87 through arcuate courses indicated by the dot-and-dash lines $a$ in Fig. 3. In order that the weights may be adjusted independently of the solenoids, the shaft 74 is extended forwardly and equipped with a hand wheel 88.

The wiring diagram of an electric circuit through which the solenoids 65 and 66 are controlled, is shown in Fig. 11. A source of electric energy is represented by a battery 90 and a conductor 91 leads from one side of the battery to a contact 92 that is adapted to be engaged by the contact 93 when the latter contact is swung toward the former by a rotating cam 94 that is driven by clockwork mechanism indicated generally at 95. As a consequence of this arrangement, the contacts 92 and 93 are engaged intermittently and momentarily. The contact 93 is connected, through a conductor 96, with one end of the windings of the solenoids 65 and 66.

The opposite side of the battery 90 is connected through a conductor 98 with the element 99 of a thermostat that is shown conventionally at 100. The element 99 swings in opposite directions in response to the rise and fall of the temperature and engages adjustable contact points 101 and 102 that are carried by a plate 103 that is pivoted at 104 to a base 105. The lower end of the plate 103 is shown as provided with a pointer 106 which cooperates with a scale 107 on the base to enable the thermostat to be set to effect and maintain various temperatures represented by this scale. A conductor 110 leads from the contact point 101 to the winding of the solenoid 65, and a conductor 111 leads from contact point 102 to the winding of the solenoid 66.

In considering the operation of the apparatus it will be assumed that water is present in the generator and that the mechanism 48 is positioned upon the outer end of the lever 40 so as to overbalance and thus open the damper 25. Oil is introduced into the preheating burner 8 and the same is ignited by means of a match, taper or the like. The flame of this preheating burner rises through the passageway 14 and heats the generator 28 thereby generating steam which is conducted through the pipe 31 to the burner 33. As the steam issues from the nozzle 32, it sucks oil from the nozzle 34 and atomizes it, whereupon the oil and steam mixture, mingled with air supplied through the burner opening of the combustion chamber, ignites from the preheating burner and a part of the flame passes up through the passageway 14 to continue heating the generator 28, while the remainder of the flame passes rearwardly through the combustion chamber 13 and into the fire box 5 of the furnace 2.

The steam pressure within the generator is communicated through the pipe 57 to bellows 53 and when the pressure rises sufficiently it will expand the bellows and depress the inner end of the lever 40 in opposition to the weight of the mechanism 48, thus closing the damper 25 which will shield the generator 28 from the heat of the flames. As a consequence of this the steam pressure within the generator will fall, the bellows 53 will relax, and the weight of the mechanism 48 will lift the damper 25. As a matter of fact, in practice, the damper ordinarily swings through a limited range of movement, seldom completely closing.

It will be understood that the thermostat 100 is situated in a room or apartment that is heated by the furnace 2 and which is to be kept at a substantially uniform temperature. When the temperature drops sufficiently to cause the thermostatic element 99 to swing to the left and engage the contact point 101, a circuit will be established (each time the contacts 92 and 93 are brought together by the clockwork mechanism 95) through conductor 91, contacts 92 and 93, conductor 96, the winding of the solenoid 65, conductor 110, contact point 101, thermostatic element 99 and conductor 98. At each impulse of the current and the consequential momentary energization of the solenoid 65, the corresponding pawl carrying plate 73, with its pawl 71, will be elevated to rotate the gear 79 and the shaft 74, and, through the connections previously described, swing the weights 87 outwardly. This has the effect of shifting the center of gravity of the control mechanism 48 further from the fulcrum of the lever 40, thereby requiring greater steam pressure acting through the bellows 53 to depress the inner end of the lever and close the damper 25. This higher steam pressure within the generator causes a greater amount of fuel oil to be discharged from the burner and as a result the fire enlarges and the heat increases. The intermittent outward shifting of the weights 87 will continue until sufficient heat is created by the apparatus to raise the temperature in the room or apartment wherein the thermostat is located to cause the thermostatic element to withdraw from the contact point 101, and the apparatus will then continue to function under the present adjustment of the weights until contact is again made between the thermostatic element 99 and one or the other of the contact points 101 and 102. If the outside or atmospheric temperature continues to fall and causes a like change in the temperature of the room or apartment, contact will again be made between the thermostatic element and the contact point 101. On the other hand, if the outside or atmospheric temperature rises, so that the heat from the furnace causes a marked rise in the temperature of the room, the thermostatic element 99 will swing in the opposite direction and engage the contact point 102, whereupon the previously described circuit will be established excepting it will be made through the branch conductor 111 instead of the one designated 110, thereby causing solenoid 66 to be energized and, through the mechanism connected with its movable core 66ª, rotate the shaft 74 in the reverse direction and swing the weights 87 inwardly.

The several modifications of the control mechanism that are illustrated in the remaining views (Figs. 12 to 22) of the drawings involve the solenoids and, with the exception of the form shown in Figs. 21 and 22, they incorporate also the pawls carrying plates, pawls etc. up to and including the shaft 74. All parts of the modifications which are identical in function and substantially so in form with the parts of the mechanism previously described will be designated by the same reference characters.

In the modification illustrated in Figs. 12, 13 and 14, the casing 60 occupies a position, relative to the rods 44, at right angles to that which it occupies in the previously described embodiment, and the shaft 74 is extended and is supported in a bearing 150 that is shown as fitted within an opening in the downwardly extending portion of the housing 60 and secured thereto by screws 151. Beyond the bearing 150 the shaft 74 has fastened to it a hub 152 from which extends an arm 153 that carries a weight 154. Fixed against rotation with respect to the hub 152 is a gear 155 which meshes with a similar gear 156 carried by a stub shaft 157 that is supported within a bearing 158, secured to a wall 159 of a substantially U-shaped frame that is shown as attached to the housing 60 by screws 160. Rotating with the gear 156 is a hub 162 from which extends an arm 163 that carries, at its outer end, a weight 164.

The weights 154 and 164 swing in a plane parallel to the axis of the lever 40, and as the shaft 74 is rotated in a clockwise direction (as the mechanism is viewed in Fig. 13) it causes the weights to be swung rearwardly or, in other words, toward the fulcrum of the lever 40, as indicated by the arrows associated with the arms 153 and 163 in Fig. 13; and when the shaft is rotated in the opposite direction, the weights are swung outwardly so as to increase the damper-lifting power of the control mechanism.

The weights are notched at 165 to provide clearance for the gears 155 and 156 and for the arms 153 and 163 when the weights are in either of their extreme positions.

In the modification of the invention illustrated in Fig. 15, the housing 60 is secured, as by screws 170, to a plate 40ª that is formed on the outer end of the lever 40, and the shaft 74 is extended forwardly a considerable distance and threaded, the threaded section of the shaft being designated 171. A weight 172 operates in the manner of a nut on the shaft 171 and it is held against rotation by having a spline 174, that is cut in its periphery, engaged with a rail 175 on the lower side of a bracket 176 that extends forwardly from the housing 60. The shaft is supported at its forward end in an arm 177 that is secured to and depends from the outer end of the bracket. Beyond the arm 177, a hand wheel 175 is secured to the shaft so that the shaft may be manually rotated to adjust the weight 172 independently of the mechanism that is operated by the solenoids.

In the form of the invention illustrated in Figs. 16 and 17, a pinion 180 is fastened to the rear end of the shaft 74 and the same meshes with a rack 181 that is carried by a stand 182 which rises from and is fastened, by screws 183, to a base 184. This base has bores through which the rods 44 extend, and the base is adapted to be held in any position to which it is adjusted along the rods by set screws 185. Slidable within guideways 186 that are formed in the top surface of the base 184 are shoes 187 that are shown as formed integral with and at the lower end of the housing 60. The shoes are retained against vertical displacement by angle members 188 which are applied to and extend downwardly from the outer sides of the shoes and are engaged beneath the edge portions of the base.

It will be observed that the guideways 186 are substantially parallel to the axis of the lever 40 of which the rods 44 are a part, and it is clear that when the shaft 74 is rotated it will adjust the housing 60 longitudinally of the base (or of the lever) through the cooperation of the pinion 180, which moves with the housing, and the rack 181, which is fixed with respect to the base.

It will be noted that in this case the mechanism is shiftable bodily with respect to the lever. The same is true of the next modification which we shall now describe and which is illustrated in Figs. 18 and 19.

In the present case, the housing 60 is pivotally connected at its lower end, as indicated at 190, to a bracket 191 that extends downwardly and forwardly from the forward end of the lever 40. The lever 40 incorporates a rack 193 which is laid out on an arc that is substantially concentric with the pivot 190, and meshing with the rack is a spur gear 194 that is fixed to a shaft 195, supported in brackets 196 that extend rearwardly from the adjacent wall of the housing 60. A worm wheel 198 is also fastened to the shaft 195 and it meshes with a worm 199 that is secured to the rear end of the shaft 74. It will follow from this that when the shaft 74 is rotated, the movement thereof will be imparted, through the worm 199, worm wheel 198 and shaft 196 to gear 194; and as said gear is rotated it will travel along the rack 193, thus causing the housing 60 to be swung inwardly or outwardly on the pivot 190 and thus change the damper-lifting influence of the mechanism.

In the modification illustrated in Fig. 20, the housing 60 is fastened, as by screws 200, to the front wall of the casing 1 of the fuel oil burning apparatus. Thus, in this case, the automatic control mechanism is stationary. Supported vertically within brackets 201 and 202 that extend from the lower portion of the housing 60 is a screw 203 that is held against turning with respect to the supporting brackets by a set screw 204 that is threaded through a part of the bracket 201 and has its inner end engaged within a spline 205 of the screw. The hub 208 of a worm wheel 209 is threaded on the shaft 203 and is confined between the opposed surfaces of the bearing portions of brackets 201 and 202. The worm wheel meshes with a worm 210 on the end of shaft 74. A cone 212 bears against the pointed lower end of the shaft 203, and between the flanged peripheral portion of the cone, and the forward end of the lever 40, a spring 215 is compressed. The spring 215 acts in opposition to the bellows 53 to swing the lever 40 in a direction to lift the damper and its tension is varied by the adjustment of the screw 203. This ordinarily is accomplished automatically by the thermostatically controlled electrical mechanism, although it may be effected manually by means of a hand wheel 88 that is applied to the end of the shaft 74 opposite the worm 210.

In Figs. 21 and 22, a basin 220 is shown as supported by the forward end of the lever 40, and the same is divided into compartments 221 and 222 by a partition 223. Each of the compartments is provided with a well that is designated by the same reference character as the compartment, augmented by the exponent *a*. It will be observed that the wall which divides each compartment from its respective well is considerably lower than the partition 223. Consequently each well, when it is caused to overflow, will discharge into its respective compartment. A relatively slow flow of liquid from compartment 221 into well 222ª is effected through a comparatively small port 224, and from compartment 222 into well 221ª, through a similar port 225. Operating within the wells 221ª and 222ª are displacement members 228 and 229, respectively. These displacement members are carried by the forward ends of levers 230 which are pivoted at 231 to brackets 232 that rise from the bottom wall of the basin 220. The housing 60 surmounts a cover 233 that is applied to the basin, and the cores of the solenoids 65 and 66 that are contained in said housing are pivotally connected at their lower ends to the rear ends of the levers 230.

As either one of the solenoids is energized it will swing the lever 230 to depress the displacement member carried thereby and cause the liquid contained within the well occupied by said displacement member to overflow the shallow wall of the well into the corresponding compartment, and as often as the solenoid is energized this operation will be repeated, thus causing a gradual displacement of the liquid from one compartment to the other, it being apparent that each well receives its supply of liquid through the comparatively small port 224 or 225, as the case may be, and due to the restricted area of the port, there will be no appreciable return of the liquid through said port during the relatively quick downward thrust of the displacement member. Thus it will be seen that, in this instance, the damper-lifting power of the mechanism is varied through the shifting of the liquid from one compartment to the other of the basin 220. The displacement members and wells will be recognized as a simple form of pump for shifting the liquid as above described. Any other form of pump that is suited to the purpose may be substituted for the foregoing without departing from the spirit of the invention.

Having thus described our invention, what we claim is:

1. In mechanism of the character set forth, the combination of an element that is adapted to be moved in opposite directions, two members normally out of contact with said element and arranged to assume holding engagement with said element when moved into contact therewith, and electromagnetic means for moving each member into engagement with the element and for shifting the member thereby to move the element, the respective members serving to move the element in opposite directions.

2. In mechanism of the character set forth, the combination of an element that is adapted to be moved in opposite directions, two members arranged to assume holding engagement with said element when moved into contact therewith, electromagnetic means for moving each member into engagement with the element and for shifting the member thereby to move the element, the respective members serving to move the element in opposite directions, and means for manually moving the element.

3. In mechanism of the character set forth, the combination of a gear, two pawls for cooperation with said gear and normally out of engagement therewith, and electromagnetic means for moving each pawl into engagement with the gear and for shifting the pawl thereby to rotate the gear, the respective pawls serving to move the gear in opposite directions.

4. In mechanism of the character set forth, the combination of a gear, two pawls for cooperation with said gear and normally out of engagement therewith, electromagnetic means for moving each pawl into engagement with the gear and for shifting the pawl thereby to rotate the gear, the respective pawls serving to move the gear in opposite directions, and means for manually rotating the gear.

5. In mechanism of the character set forth, the combination of a shaft, a shiftable weight, operative connections between the shaft, and weight whereby when the shaft is rotated in opposite directions it will correspondingly move the weight, two electromagnetic devices, and operative connection between each of said devices and the shaft, each of the devices acting to move the shaft in a direction opposite to that in which it is moved by the other device.

6. In mechanism of the character set forth, the combination of a shaft, a shiftable weight, operative connections between the shaft and weight whereby when the shaft is rotated in opposite directions it will correspondingly move the weight, two electromagnetic devices, power transmitting means through which each of said devices is adapted to rotate the shaft, said means being normally out of driving connection with the shaft and assuming such connection therewith when the respective device is energized, each of the devices acting to move the shaft in a direction opposite to that in which it is moved by the other device, and means for manually rotating the shaft.

7. In mechanism of the character set forth, the combination of a shaft that is adapted to be moved in opposite directions, a shiftable weight, connections between the shaft and said weight whereby the weight is moved in opposite directions when the shaft is correspondingly moved, a gear having driving connection with said shaft, two pawls normally out of engagement with the gear, electromagnetic means for moving each pawl into engagement with the gear and for shifting said pawl thereby to rotate the gear, the pawls acting upon said gear in opposite directions.

8. In mechanism of the character set forth, the combination of a gear, pawl carrying elements shiftable with respect to the gear, a pawl pivotally connected to each element and normally out of engagement with the gear, and electromagnetic means for swinging each pawl into engagement with the gear and for moving the pawl carrying element thereby to rotate the gear, each pawl acting to rotate the gear in a direction opposite to that in which it is rotated by the other pawl.

9. In mechanism of the character set forth, the combination of a gear, pawl carrying elements shiftable with respect to the gear, a pawl pivotally connected to each element and normally out of engagement with the gear, two solenoids, connections between the core of each solenoid and one of said pawls, the solenoid acting, when energized, to swing the respective pawl into engagement with the gear and, through the intervention of the pawl, move the pawl carrying element thereby to rotate the gear, each pawl acting to rotate the gear in a direction opposite to that in which it is rotated by the other pawl.

10. In mechanism of the character set forth, the combination with a gear that is rotatable in opposite directions, pawl carrying elements pivoted upon the axis of the gear, a pawl pivotally connected to each element and normally out of engagement with the gear, means for adjusting the normal position of each pawl carrying element, two solenoids, connections between the core of each solenoid and one of the aforesaid pawls, the solenoid when energized serving to swing the pawl into engagement with the gear and, through the intervention of the pawl, rotate the pawl carrying element thereby to correspondingly move the gear, each pawl acting to move the gear in a direction opposite to that in which it is moved by the other pawl.

11. In mechanism of the character set forth, the combination of a housing having opposed abutment portions, a shaft supported between said abutment portions, a gear on said shaft, two pawl carrying plates journaled upon the shaft, an adjusting screw carried by each plate and engaging one of the abutment portions of the housing whereby the normal position of the plate may be varied, a pawl pivoted to each plate and normally out of engagement with the gear, two solenoids supported by the housing, means connecting the core of each solenoid to one of said pawls whereby when the solenoid is energized it will swing the pawl into engagement with the gear and, through the intervention of the pawl, swing the pawl carrying plate thereby to rotate the gear, each pawl acting to move the gear in a direction opposite to that in which it is moved by the other pawl.

12. In mechanism of the character set forth, the combination of a housing having opposed abutment portions, a shaft supported between said abutment portions, a gear on said shaft, two pawl carrying plates journaled upon the shaft, an adjusting screw carried by each plate and engaging one of the abutment portions of the housing whereby the normal position of the plate may be varied, a pawl pivoted to each plate and normally out of engagement with the gear, two solenoids supported by the housing, means connecting the core of each solenoid to one of said pawls whereby when the solenoids is energized it will swing the pawl into engagement with the gear and, through the intervention of the pawl, swing the pawl carrying plate thereby to rotate the gear, each pawl acting to move the gear in a direction opposite to that in which it is moved by the other pawl, the pawls and pawl carrying plates having parts which cooperate to limit the swinging movement of the pawls with respect to the plates.

13. In mechanism of the character set forth, the combination of a supporting structure, a shaft rotatably supported thereby, a weight pivotally supported by the structure, driving connections between the shaft and said weight, and electromagnetic means sustained by the structure for moving the shaft in opposite directions.

14. In mechanism of the character set forth, the combination of a supporting structure, a shaft rotatably supported thereby, a weight pivotally supported by the structure, driving connections between the shaft and weight, two electromagnetic means sustained by the structure, and operative connection between said means and the shaft, each of said means acting to move the shaft in a direction opposite to that in which it is moved by the other means.

15. In mechanism of the character set forth, the combination of a supporting structure, a shaft rotatably supported thereby, a worm on said shaft, worm wheels engaging opposite sides of the worm and rotatably sustained by the structure, a shiftable weight having driving connections with each worm wheel, and electromagnetic means sustained by the structure for rotating the aforesaid shaft in opposite directions.

16. In mechanism of the character set forth, the combination of a supporting structure, a pair of shafts supported in substantially parallel relation by said structure, a worm wheel on each shaft, an arm extending from each shaft, a weight carried by each arm, a worm disposed between and meshing with the worm wheels, a drive shaft rotatably supported by the structure and whereon said worm is mounted, and electromagnetic means carried by the structure for rotating the drive shaft.

17. In mechanism of the character set forth, the combination of a supporting structure, a pair of shafts supported in substantially parallel relation by said structure, a worm wheel on each shaft, an arm extending from each shaft, a weight carried by each arm, a worm disposed between and meshing with the worm wheels, a drive shaft rotatably supported by the structure, and whereon said worm is mounted, electromagnetic means carried by the structure for rotating the drive shaft in opposite directions, said means being normally out of driving connection with said shaft but assuming driving connection therewith when energized, and means for manually rotating the drive shaft.

In testimony whereof, we hereunto affix our signatures.

LEE S. CHADWICK.
MARC RESEK.
J. ALGER DAHLSTROM.